United States Patent [19]

Hardy et al.

[11] Patent Number: 4,852,657
[45] Date of Patent: Aug. 1, 1989

[54] APPARATUS FOR SELECTIVELY POSITIONING MOVABLE WORK ELEMENT WITH PRESELECTED MAXIMUM VELOCITY CONTROL

[75] Inventors: Gerald D. Hardy, East Peoria; John P. Hoffman; Larry E. Kendrick, both of Peoria, all of Ill.

[73] Assignee: Caterpillar Inc., Peoria, Ill.

[21] Appl. No.: 881,412

[22] Filed: Jul. 2, 1986

[51] Int. Cl.⁴ .......................... A01B 63/111
[52] U.S. Cl. ......................... 172/2; 91/361; 91/459
[58] Field of Search ............ 172/1, 2, 4, 7, 8, 9, 172/10; 364/424, 153, 174, 190; 318/561, 616, 617, 628; 307/152; 91/361, 364, 459, 461; 60/463, 470; 340/670, 684

[56] References Cited

U.S. PATENT DOCUMENTS

| | | | |
|---|---|---|---|
| 3,729,668 | 4/1973 | Brette | 318/617 X |
| 4,132,272 | 1/1979 | Holloway et al. | 172/2 |
| 4,132,273 | 1/1979 | Mortonson et al. | 172/2 |
| 4,292,884 | 10/1981 | Schumacher et al. | 91/459 X |
| 4,454,919 | 6/1984 | Arnold et al. | 172/1 |
| 4,486,693 | 12/1984 | Hamati et al. | 318/616 X |
| 4,491,776 | 1/1985 | Veale | 318/617 X |
| 4,529,039 | 7/1985 | Sakundiak | 172/4 |
| 4,574,227 | 3/1986 | Herder et al. | 318/616 X |
| 4,594,536 | 6/1986 | Tamagaki | 318/561 |
| 4,612,489 | 9/1986 | Gunda | 318/561 X |
| 4,694,229 | 9/1987 | Cormack | 318/561 |

FOREIGN PATENT DOCUMENTS

| | | |
|---|---|---|
| 43725 | 1/1982 | European Pat. Off. |
| 2927585 | 4/1980 | Fed. Rep. of Germany |
| 3316305 | 11/1984 | Fed. Rep. of Germany |
| 59-47504 | 3/1984 | Japan |
| 2038507 | 7/1980 | United Kingdom |

*Primary Examiner*—Richard T. Stouffer
*Attorney, Agent, or Firm*—Terry D. Morgan; Robert E. Muir

[57] ABSTRACT

Agricultural vehicles have heretofore lacked an adaptive implement hitch control and have correspondingly suffered from poor controllability of the hitch when the mass of the implement is varied significantly. The apparatus employs a sensor connected to and movable with the hitch such that a variable magnitude electrical signal is delivered which corresponds to the instantaneous hitch position. This signal is electronically differentiated to produce a signal indicative of actual hitch velocity. The hitch position and velocity signals are both used as feedback signals to close the control loop of the control and thereby provide an adaptive hitch velocity control.

14 Claims, 7 Drawing Sheets

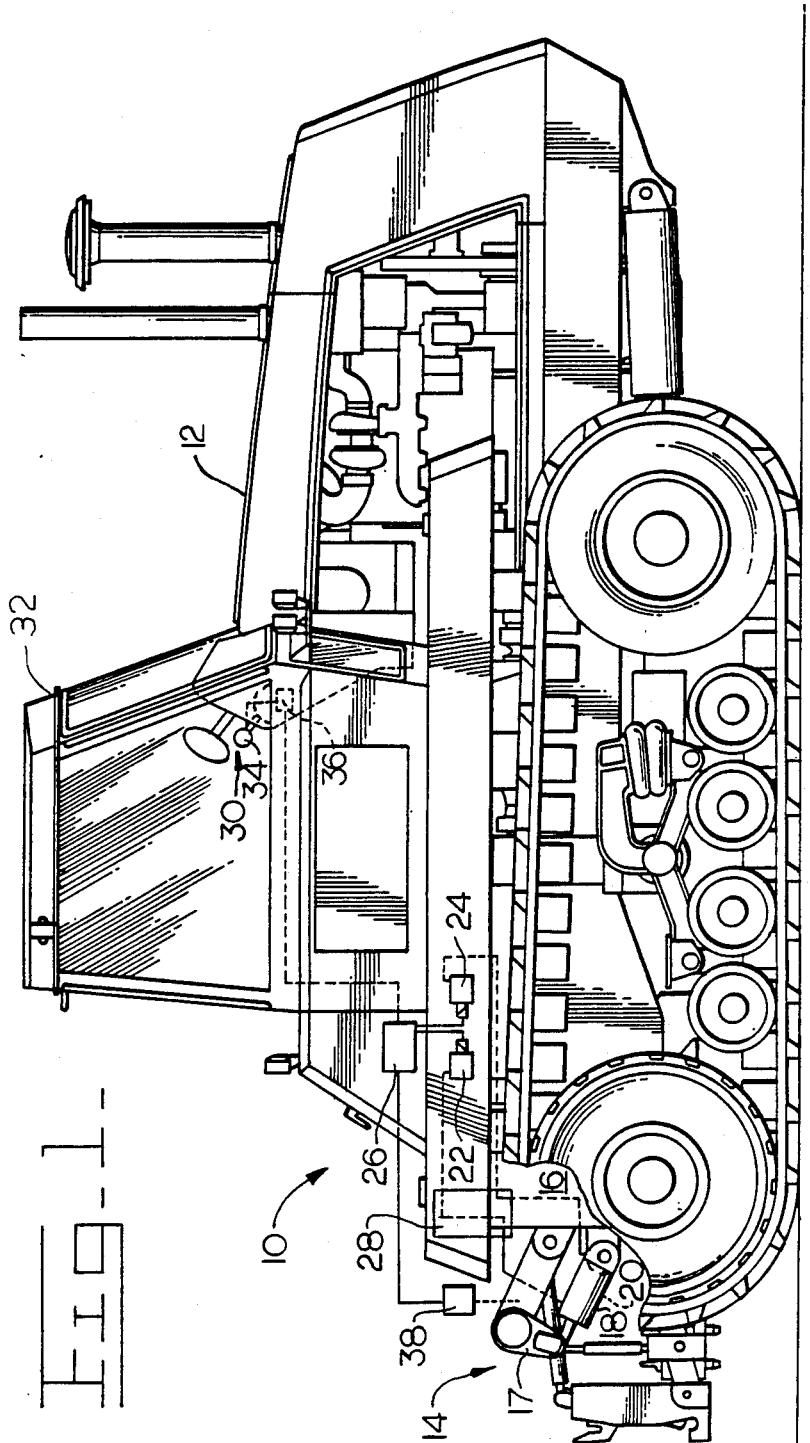

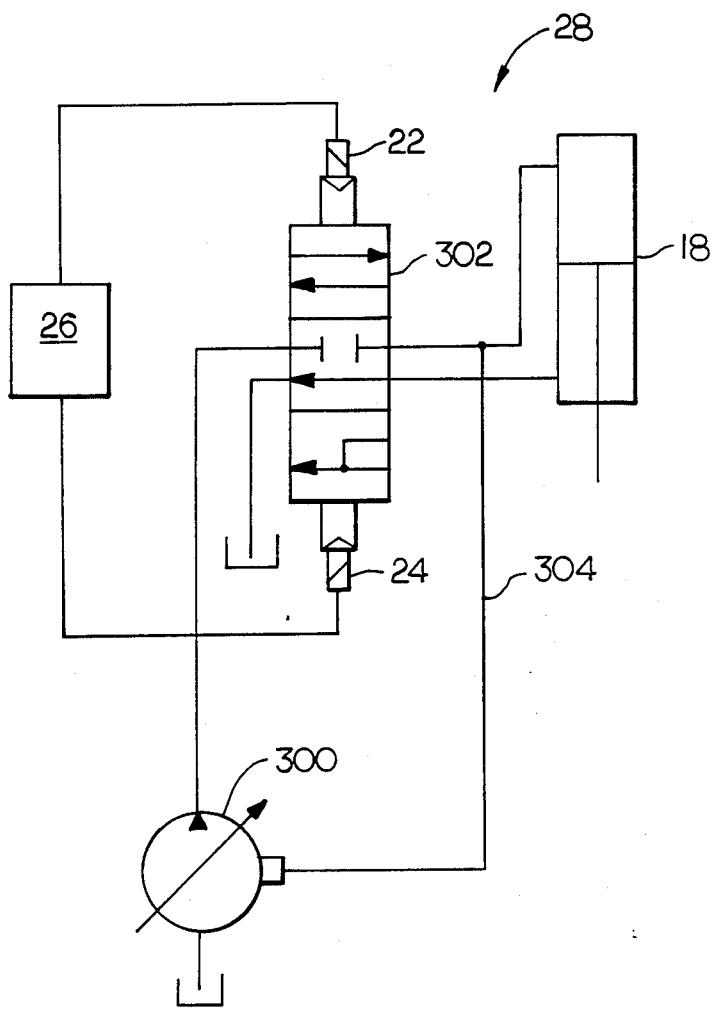
Fig_2_

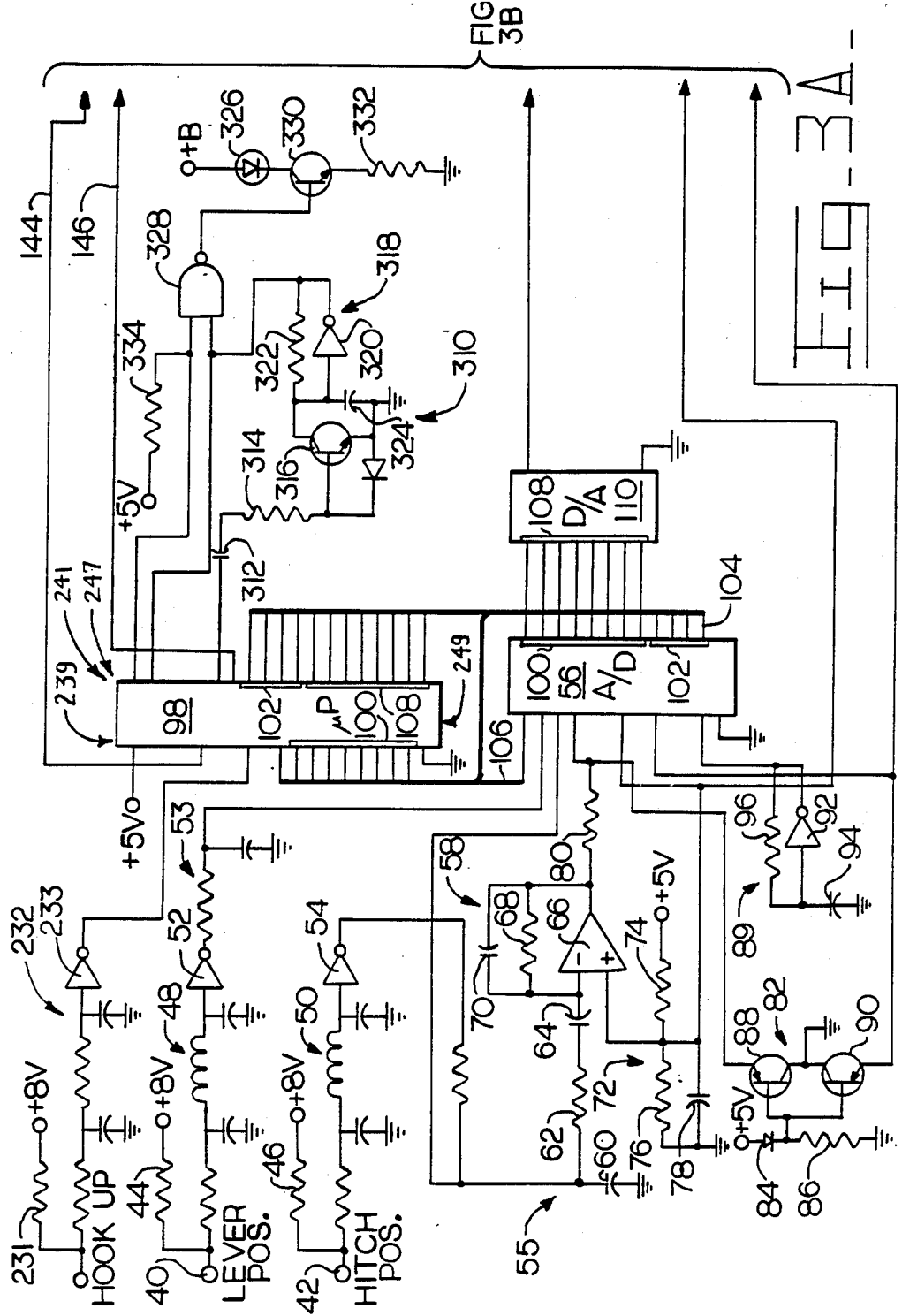

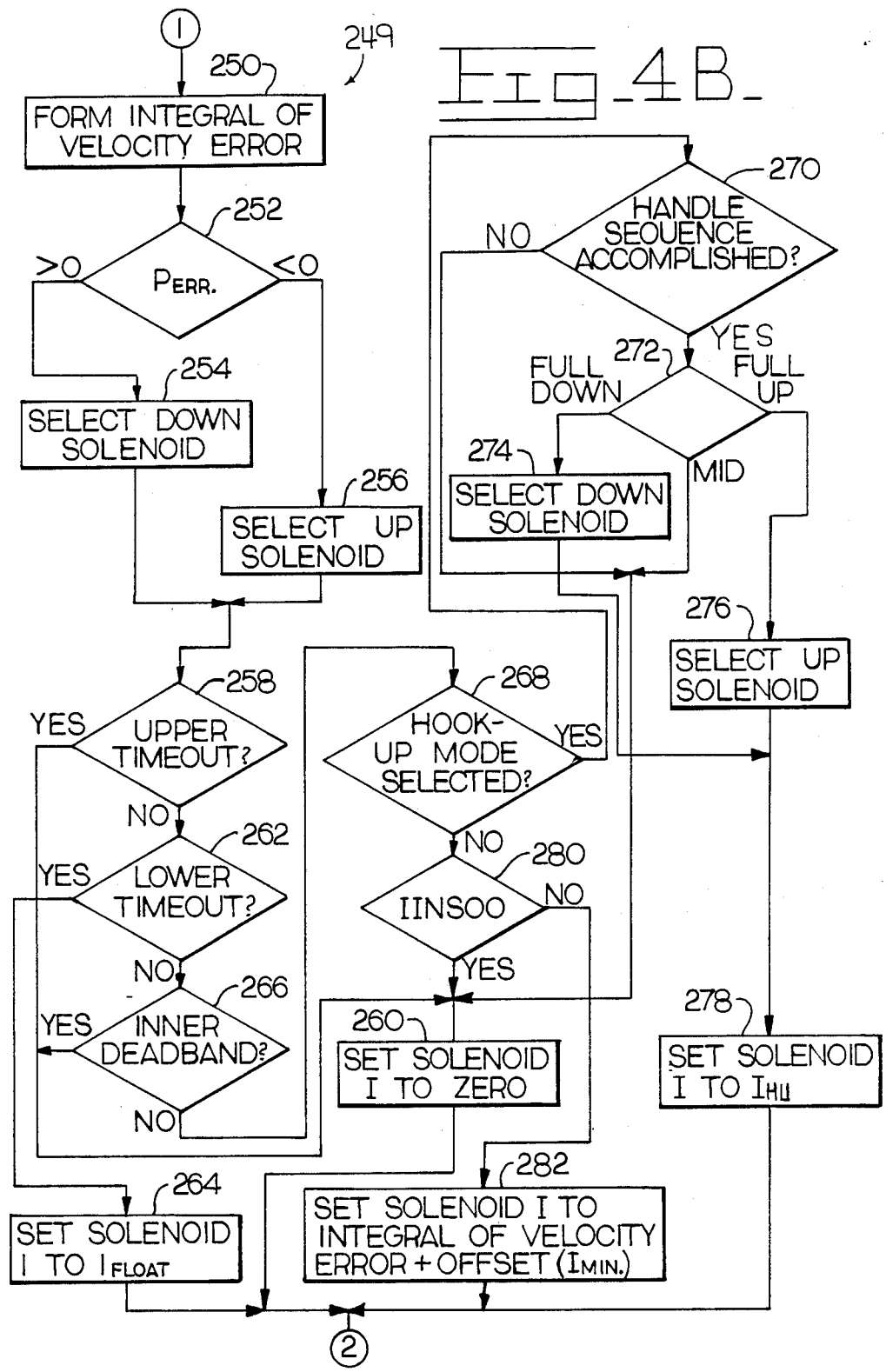

APPARATUS FOR SELECTIVELY POSITIONING MOVABLE WORK ELEMENT WITH PRESELECTED MAXIMUM VELOCITY CONTROL

DESCRIPTION

1. Technical Field

This invention relates generally to an apparatus for controllably positioning a hitch of an agricultural vehicle, and more particularly, to an apparatus for positioning and controlling the instantaneous velocity of the hitch of an agricultural vehicle.

2. Background Art

In the field of agricultural vehicles, it is commonplace for a single vehicle to be used in a wide variety of applications and to tow a broad spectrum of implements. The implements are usually interchangeably connected to the vehicle using a hitch arrangement which is typically powered via a hydraulic pump and cylinder to controllably lift and lower the attached implement. These implements can typically vary from light duty cultivators to extremely large plows which have corresponding variations in mass. To maintain the controllability of the hitch, prior controls have typically employed an adjustable throttling device to limit hydraulic fluid flow to the hydraulic cylinders. For example, the hydraulic requirements to enable such a system to lift a heavy implement are excessive when compared to the hydraulic needs of a light implement. A system designed to lift the heaviest implement can cause undesirable velocities when employed on the lightest implement. Conversely, a system with a single flow capacity for raising and lowering may give satisfactory operation when lowering a light implement, but when used on a heavy implement, the corresponding increase in hydraulic pressure can cause undesirably high rates of descent. The mass of the implement ultimately controls the velocity at which the hitch and implement descend and ascend. Heretofore, manufacturers of such systems have recognized these shortcomings and provided the adjustable throttling device which the operator may choose to manually adjust and limit flow based on his observation of the weight and configuration of the implement.

Unfortunately, such manually adjustable systems have some obvious shortcomings. Selection of a fluid flow rate to limit the descent of an implement to an acceptable rate also acts to limit the ascent of the implement in direct opposition to the desired effect. As the mass of the implement increases, so too does the speed with which it descends; however, the inverse is also true. As the mass of the implement increases, the speed with which it ascends decreases. Therefore, any action to limit the flow to decrease the rate of descent further decreases the rate of ascent, resulting in limited performance during raising of the implement. Further, a manual system is only effective when properly adjusted and cannot compensate for an operator's forgetfullness or inattention.

U.S. Pat. No. 4,529,039 issued to James M. Sakundiak attempts to overcome some of the problems set forth herein by conversion to an electronically controlled hitch positioner. In particular, Sakundiak includes separate manually adjustable potentiometers for controlling the up and down rates of movement of the hitch; however, the rates are unaffected by the actual velocity or mass of the hitch. Rather, the potentiometers act only to control the duty cycle of an electrical signal delivered to a solenoid controlled hydraulic valve. This arrangement effectively provides a manually adjustable throttling device similar in operation to that of hydraulically controlled hitch positioners. Sakundiak also suffers from coarse and unpredictable movement of the hitch as well as no provision for calibrating the solenoid-valve units.

The present invention is directed to overcoming one or more of the problems as set forth above.

DISCLOSURE OF THE INVENTION

In accordance with one aspect of the present invention, there is provided an apparatus which selectively positions a movable work element of a work vehicle at a plurality of preselected locations. The apparatus includes a control element positionable at a plurality of preselected locations, a first sensing means for delivering a first signal having a magnitude correlative to the location of the control element, and a second sensing means for delivering a second signal having a magnitude correlative to the location of the work element. A comparator means receives the first and second signals and delivers a third signal having a magnitude correlative to the difference between the first and second signals. A means receives the third signal and delivering a desired velocity signal having a magnitude correlative to the magnitude of the third signal. A means receives the second signal, differentiates the second signal, and delivers an actual velocity signal having a magnitude correlative to the velocity of the movable work element. A means receives the actual and desired velocity signals and delivers a control signal having a magnitude correlative to the absolute difference between the actual and desired velocity signals. A means receives the control signal and respectively controls the direction and velocity of movement of the work element in a direction to reduce the absolute magnitude of the third signal and the control signal.

BRIEF DESCRIPTION OF THE DRAWINGS

FIG. 1 illustrates a diagrammatic view of the vehicle, hitch system, and a block diagram of an embodiment of the present invention;

FIG. 2 illustrates an hydraulic schematic of an embodiment of the hydraulic circuitry of the present invention;

FIGS. 3a and 3b illustrate an electrical schematic of an embodiment of the electronic circuitry of the present invention;

FIG. 4b illustrates a flowchart of an embodiment of the present invention; and

BEST MODE FOR CARRYING OUT THE INVENTION

Figure 3B:
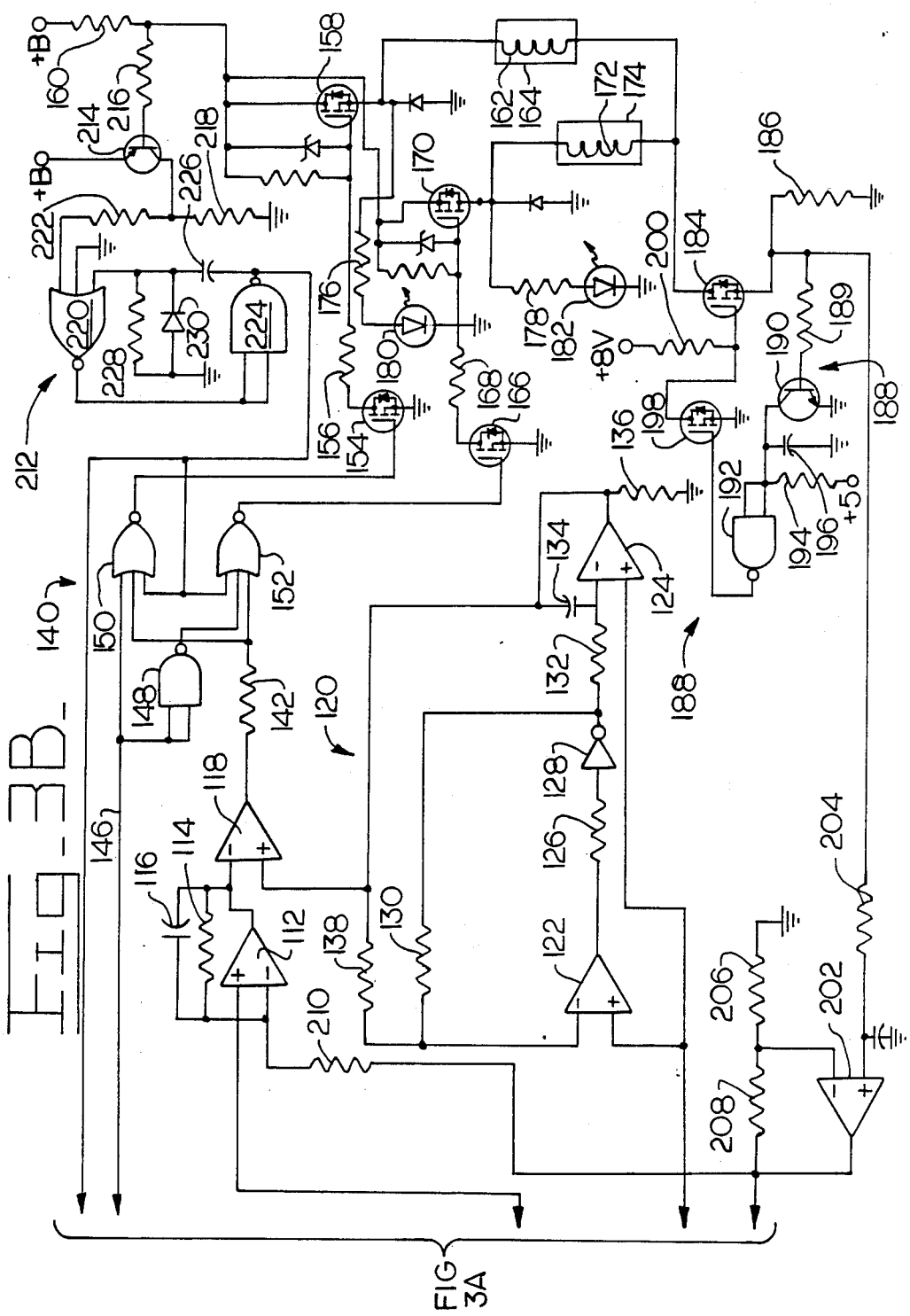

Referring now to the drawings, wherein a preferred embodiment of the present apparatus 10 is shown, FIG. 1 illustrates a rubber belted agricultural vehicle 12 with a movable work element 14 pivotally connected to the rear frame portion 16 of the vehicle 12. The apparatus 10 selectively positions the movable work element 14 of the vehicle 12 at a plurality of preselected locations. In the preferred embodiment, the work element 14 is a three point hitch 17 and includes a pair of hydraulic cylinders 18,20 extending between the hitch 17 and frame 16 to provide a hydraulic motive force to vertically raise and lower the hitch 17. The direction of fluid flow through the cylinders 18,20 determines the direction of vertical motion and is controlled by a pair of solenoids 22,24. These solenoids 22,24 are alternately actuated by a central electronic control 26 to selectively deliver pilot pressure to a hydraulic control system 28 and reverse the flow of hydraulic fluid through the cylinders 18,20 (a detailed description of the hydraulic control system 28 accompanies FIG. 2).

A control element 30 is located within the operator's cab 32, and is manually positionable by the operator to a plurality of preselected locations. Preferably, the element 30 consists of a hand operated friction type positional handle 34, wherein any position selected by the operator is frictionally maintained. A first sensing means 36 delivers a first signal having a magnitude correlative to the location of the control element 30. The first sensing means 36 can be any of a variety of position sensing electronic circuits, but preferably is a potentiometer with a tap connected to and movable with the handle 34. The output of the potentiometer is an analog signal with a variable voltage wherein the magnitude of the signal is directly proportional to the handle position. A pulse width modulating circuit converts the voltage level of the potentiometer to a variable duty cycle digital signal and delivers that signal to the central electronic control 26.

A second sensing means 38 delivers a second signal having a magnitude correlative to the location of the work element 14. The second sensing means 38 is of the same variety as the first sensing means 36 and is preferably a potentiometer with a tap connected to and movable with the hitch 17. A variable duty cycle signal is similarly delivered by the second sensing means 38 to the central electronic control 26.

FIG. 2 illustrates the hydraulic control system 28 and includes a variable displacement hydraulic pump 300 selectively connected to the hydraulic cylinder 18 through a pilot actuated three way valve 302. The solenoids 22,24 are illustrated connected to opposite ends of the valve 302. The solenoids 22,24 are separately operable under electronic control to deliver a pilot pressure to the respective ends of the valve 302 and move the spool of the valve 302 to one of the actuated positions. For example, to initiate upward movement of the cylinder 18, the controller 26 energizes the up solenoid 22 which actuates the valve 302 and connects the cylinder 18 to the output of the pump 300. Similarly, the controller 26 initiates downward movement of the cylinder 18 by energizing the down solenoid 24 which actuates the valve 302 and vents the cylinder 18 to tank. The hydraulic control arrangement illustrated herein provides powered upward movement, but relies on gravity and the mass of the implement for downward movement. Further, the hydraulic control system 28 includes a pressure feedback line 304 connected between the output of the three way valve 302 and the variable displacement hydraulic pump 300. The hydraulic control system 28 includes load sensing hydraulics of which the feedback line 304 forms an integral part. The pressure drop across the valve 302 acts to control the displacement of the hydraulic pump 300. As the pressure drop decreases, the pump displacement increases. The displacement of the pump 300 is sensitive to the valve stem opening and insensitive to the load.

FIGS. 3a and 3b illustrate an electronic schematic of one embodiment of the present invention. Electrical connections 40,42 are shown to be respectively interconnected with the first and second sensing means 36,38. Pull up resistors 44,46 are respectively connected between +8V and the electrical connections 40,42. Thus, the "low" portions of the variable duty cycle signals delivered by the first and second sensing means 36,38 pull the electrical connection points 40,42 to system ground while the respective "high" portions allow the resistors 44,46 to pull the connections points to a logically "high" level. A pair of low pass filters 48,50 remove any spurious signals and pass dc signals which have a magnitude proportional to the duty cycles. Two inverters 52,54 receive the signals and ensure that the output signal extends between ground and the positive rail. Noise induced in the wiring harness between the first and second sensing means 36,38 and the electrical connections 40,42 can level shift the variable duty cycle signal. The inverters 52,54 output full range signals relative to the +5V digital circuitry power supply independent of any level shifting induced by the sensors or wiring harness.

The outputs of the inverters 52,54 are connected through a pair of low pass filters 53,55 to a pair of inputs of a multiplexed analog to digital converter (A/D) 56. The output of the low pass filter 55 is also connected to a means 58 which receives the second signal indicative of the location of the hitch 17, differentiates the second signal, and delivers an actual velocity signal having a magnitude correlative to the velocity of the hitch 17. The means 58 includes a resistor 62 connected in series with a capacitor 64 between the inverter 54 output and the inverting input of an operational amplifier 66. The amplifier 66 functions as a differentiator by the connection of the capacitor 64 to the inverting input of the amplifier 66 and a feedback resistor 68 connected between the output and inverting input of the amplifier 66. A capacitor 70 connected in parallel with the feedback resistor 68 provides an upper frequency limit of differentiation while the resistor 62 provides the lower frequency limit of differentiation. The values of the resistor 62 and capacitor 70 are chosen with regard to closed loop stability and noise criteria. The noninverting input of the amplifier 66 is connected to a voltage divider network 72 to provide a fixed reference voltage. The divider network 72 includes a pair of resistors 74,76 connected in series between +5V and ground. The midpoint of the resistors 74,76 is connected to the noninverting input of the amplifier 66 and to an input of the A/D 56. A capacitor 78 is connected in parallel with the resistor 76 to reduce electrical noise. The output of the amplifier 66 is also connected through a resistor 80 to an input of the A/D 56 and to a voltage limiting circuit 82.

The limiting circuit 82 includes a diode 84 and a resistor 86 connected in series between +5V and ground. The voltage drop across the resistor 86 is communicated to the bases of a pair of pnp type transistors 88,90. The transistors 88,90 each have a collector connected to ground and the emitter of the transistor 88 is connected to the output of the amplifier 66. Should the output of the amplifier exceed +5V, the transistor 88 will be biased "on" and connect the output of the amplifier to ground through the resistor 80. The voltage limiting circuit is intended to protect the A/D 56 from excessive voltage. Similarly, the emitter of the transistor 90 is connected to another input of the A/D 56 and to the output of an additional circuit. The operation of the transistor 90 is identical to that of the transistor 88 and serves to protect the A/D from excessive voltage from the additional circuit. An oscillator circuit 89 is connected to the clock input of the A/D 56. The oscillator 89 is of conventional design and includes a Schmitt trigger 92 with an input connected to ground through a capacitor 94 and to its own output via a resistor 96. The oscillator 89 produces a clock signal for the A/D 56 at a fixed frequency related to the values of the capacitor 94 and resistor 96.

A microprocessor 98 is connected to the A/D 56 via a data port 100 for transferring the magnitude of the selected analog input signal from the A/D 56 as an 8-bit binary word. The analog signal is selected by the microprocessor 98 via an address port 102 which includes a start pulse 104 in the most significant bit of the address port 102. An end of conversion signal is delivered by the A/D 56 to the microprocessor on line 106 to signal when the 8-bit binary word on the data port 100 reflects the magnitude of the selected analog signal. The A/D 56 used in the present embodiment is commercially available from National Semiconductor as part number ADC0809. The microprocessor operates under software control which can best be described by referring to the flowcharts shown in FIGS. 4a, 4b, and 4c discussed later in this specification.

An 8-bit output port 108 interconnects the microprocessor 98 and a digital to analog converter (D/A) 110. The microprocessor 98 acts under software control to deliver an 8-bit binary word over the link 108 wherein the magnitude of the word is converted to an analog signal with a voltage of corresponding magnitude. The analog signal is delivered from the D/A 110 to the noninverting input of an operational amplifier 112 connected as a differential amplifier. A parallel combination of a resistor 114 and capacitor 116 are connected between the output and inverting input of the amplifier 112. An operational amplifier 118 is connected as a comparator and has an inverting input connected to the output of the amplifier 112 and a positive input connected to a triangle waveform generator 120.

The triangle waveform generator 120 includes a pair of operational amplifiers 122,124 each having a noninverting input connected to the voltage divider network 72. The amplifier 122 has an output connected through a resistor 126, inverter 128, and resistor 130 to its own inverting input. The amplifier 124 has an inverting input connected through a resistor 132 to the output of the inverter 128 and to its own output via a capacitor 134. The output of the amplifier 124 is connected to ground by a resistor 136, the noninverting input of the amplifier 118, and the inverting input of the amplifier 122 via a resistor 138.

A logic circuit array 140 is connected to the output of amplifier 118 through a resistor 142 and acts to determine which of the up or down solenoids is selected. An output line 146 from the microprocessor 98 controls which of the solenoids is selected via software control. The line 146 is connected to both inputs of a NAND gate 148 acting as an inverter and to one input of a three input NOR gate 150. The output of the NAND gate 148 is connected to an input of a second three input NOR gate 152. Each of the NOR gates 150,152 also receive an input from the amplifier 118 through the resistor 142.

The output of the first NOR gate 150 is connected to the gate of an n-channel FET type transistor 154. The transistor 154 has a source connected to ground and a drain connected through a resistor 156 to the gate of a p-channel FET type power transistor 158. The transistor 158 has a source connected to battery voltage +B through a current sensing resistor 160 and a drain connected to the winding 162 of the down solenoid 164. Similarly, the output of the second NOR gate 152 is connected to the gate of an n-channel FET type transistor 166. The transistor 166 has a source connected to ground and a drain connected through a resistor 168 to the gate of a p-channel FET type power transistor 170. The transistor 170 also has a source connected to battery voltage +B through the current sensing resistor 160 and a drain connected to the winding 172 of the up solenoid 174. Both of the power transistors 158,170 each have a respective resistor 176,178 and a light emitting diode (LED) 180,182 connected to their drains whereby the LED 180,182 is biased "on" when the transistor 158,170 is biased "on". The LEDs 180,182 give a visual indication of the state of the solenoids 164,174.

Both of the windings 162,172 are connected to ground through an n-channel FET type transistor 184 and a current sensing resistor 186. The transistor 184 forms an integral portion of an overcurrent protection circuit 188. The source of the transistor 184 is connected through a resistor 189 to the base of an npn type transistor 190. The transistor 190 has an emitter connected to ground and a collector connected to both inputs of a two input NAND gate 192 so as to act as an inverter. A pull up resistor 194 normally connects the inputs of the NAND gate 192 to +5V and a capacitor 196 is used to limit noise. The output of the NAN gate 192 is connected to the gate of an n-channel FET type transistor 198 which has a source connected to ground and a drain connected to +8V through a pull up resistor 200 and to the gate of the transistor 184. When the current exceeds a preselected limit, the voltage drop across the current sensing resistor 186 biases the transistor 190 "on". A "low" signal is delivered to the NAND gate 192 which biases the transistor 198 "on" and the transistor 184 "off" discontinuing the flow of current.

The current sensing resistor 186 also provides a feedback signal indicative of the actual current flowing through the solenoids 164,174. The actual current is then compared to the desired current by the operational amplifier 112. An operational amplifier 202 has a noninverting input connected through a resistor 204 to the current sensing resistor 186 and an inverting input connected to ground through a resistor 206 and to its own output via a resistor 208. The output of the amplifier 202 is a scaled version of the voltage drop across the current sensing resistor 186 and is delivered to the inverting input of the operational amplifier 112 through a resistor 210, an input port of the A/D 56, and the emitter of the transistor 90. The output of amplifier 112 is proportional to the difference between the actual and desired current levels and is compared to the triangle waveform by amplifier 118. The output of amplifier 118 is a fixed frequency variable duty cycle signal which ultimately controls the state of power transistors 158,170 to influence the magnitude of the current flowing therein. The frequency o the signal has been selected to provide dither to the solenoid valves 164,174 and help to prolong their lives by reducing crudding.

A logic circuit 212 provides short circuit protection for both of the power transistors 158,170. The circuit 212 includes a pnp type transistor 214 which has an emitter connected to +B, a base connected through a resistor 216 to the sources of transistors 158,170, and a collector connected to ground through a resistor 218 and one input of a NOR gate 220 via a resistor 222. The output of the NOR gate 220 is connected to both inputs of a two input NAND gate 224 acting as an inverter. The output of the NAND gate 224 is connected through a capacitor 226 to an input of the NOR gate 220 and to ground through a resistor 228 and a diode 230. The output of the NAND gate 224 is also connected to one input of both of the three input NOR gates 150,152 and to an input port of the microprocessor 98. During a short circuit condition, the voltage drop across the resistor 160 is sufficient to bias transistor 214 "on" and deliver a "high" signal to NOR gate 220. The NOR gate 220 outputs a "low" signal which is inverted by the NAND gate 224 causing both of the NOR gates 150,152 to output "low" signals and bias transistors 158,170 "off".

An additional operator input located in the cab 32 is connected to the central electronic control 26 and is normally "low", but can be switched to indicate that the operator would prefer to enter an alternate mode of operation. It is desirable to operate the control as an absolute open loop positioner when connecting an implement to the hitch 17. This alternate mode of operation is referred to as the hook-up mode and includes a mechanical single-throw single pole switch (not shown) which has one pole connected to ground and another pole connected through an electrical connection and pull up resistor 231 to +8V. The second pole is also connected through a low pass filter 232 and an inverter 233 to the input of the microprocessor 98.

A watchdog timer circuit 310 is provided to recognize if the microprocessor 98 should suffer from an intermittent error such that operation of the resident software routine is discontinued. The watchdog timer 310 not only recognizes the software error but also attempts to reset the microprocessor 98 and begin executing the software at the initial routines. The timer 310 includes a capacitor 312 and resistor 314 serially connected between an output of the microprocessor 98 and the base of an npn type transistor 316. An oscillator 318 includes a Schmitt trigger inverter 320 connected in parallel with a resistor 322 and a capacitor 324 connected between system ground and the input of the Schmitt trigger 320. The collector and emitter of the transistor 316 are connected across the capacitor 324 such that a "high" signal from the microprocessor 98 biases the transistor 316 "on" and shorts the capacitor potential to zero. The output of the oscillator 318 is connected to the reset input of the microprocessor 98. The software routine periodically shorts the capacitor to zero potential at a rate greater than the frequency of the oscillator 318, thereby preventing the output of the oscillator 318 from reaching a "high" level to reset the microprocessor 98. Should the software routine cease to execute properly, then the capacitor 324 will not be reset and the oscillator 318 will reset the microprocessor 98. Correspondingly, the control signals the operator that an error is occurring by flashing a diagnostic LED 326. The output of the oscillator 318 is connected through a NAND gate 328 to the base of a npn type transistor 330. The transistor 330 has an emitter connected to system ground through a current limiting resistor 332 and a collector connected to battery voltage +B through the diagnostic LED 326. When the oscillator 318 reaches a "high" level, not only is the microprocessor 98 reset, but the diagnostic LED 326 is also flashed at the frequency of the oscillator 318. If the microprocessor 98 fails to respond to the reset signal, then the flashing LED signals the operator as to the type of failure.

The control also has the ability to signal a number of different error messages to the operator via the diagnostic LED 326. Another output from the microprocessor 98 is connected to an input of the NAND gate 328 and to +5V via a pull up resistor 334. The software routine can energize the diagnostic LED 326 by placing a "low" signal on the output line. The type of error is communicated via a sequencing of the LED 326. For example, if a handle position is detected, which is outside the range of allowable movement, then the software flashes the LED 326 four times, pauses momentarily, and then repeats. Five flashes indicates that the hitch position signal is outside the acceptable range of movement Similar codes can be established for a wide range of faults, thereby easing the job of trouble shooting a failed control.

Figure 4A:
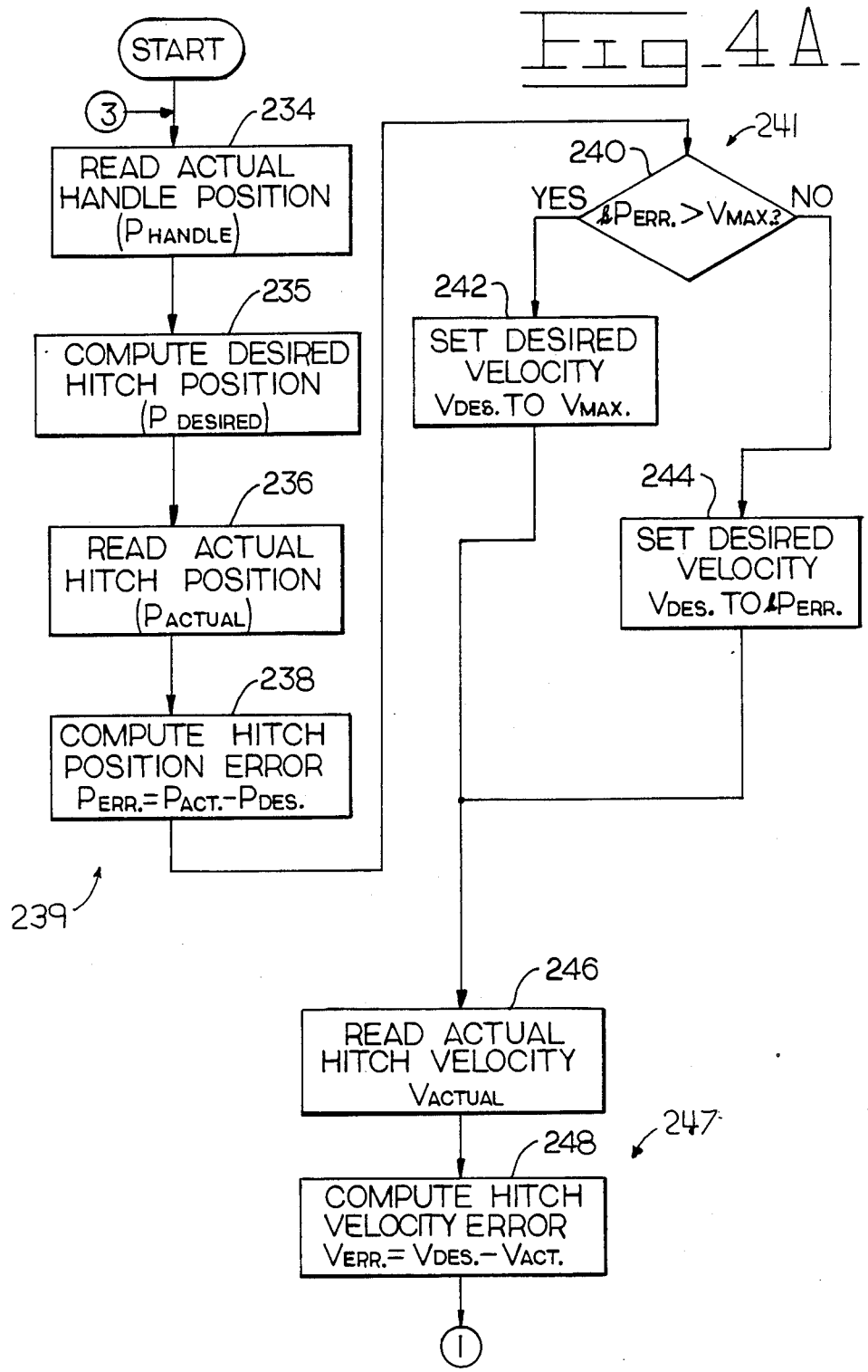
FIG. 4a illustrates a flowchart of an embodiment of the present invention.
Figure 4C:
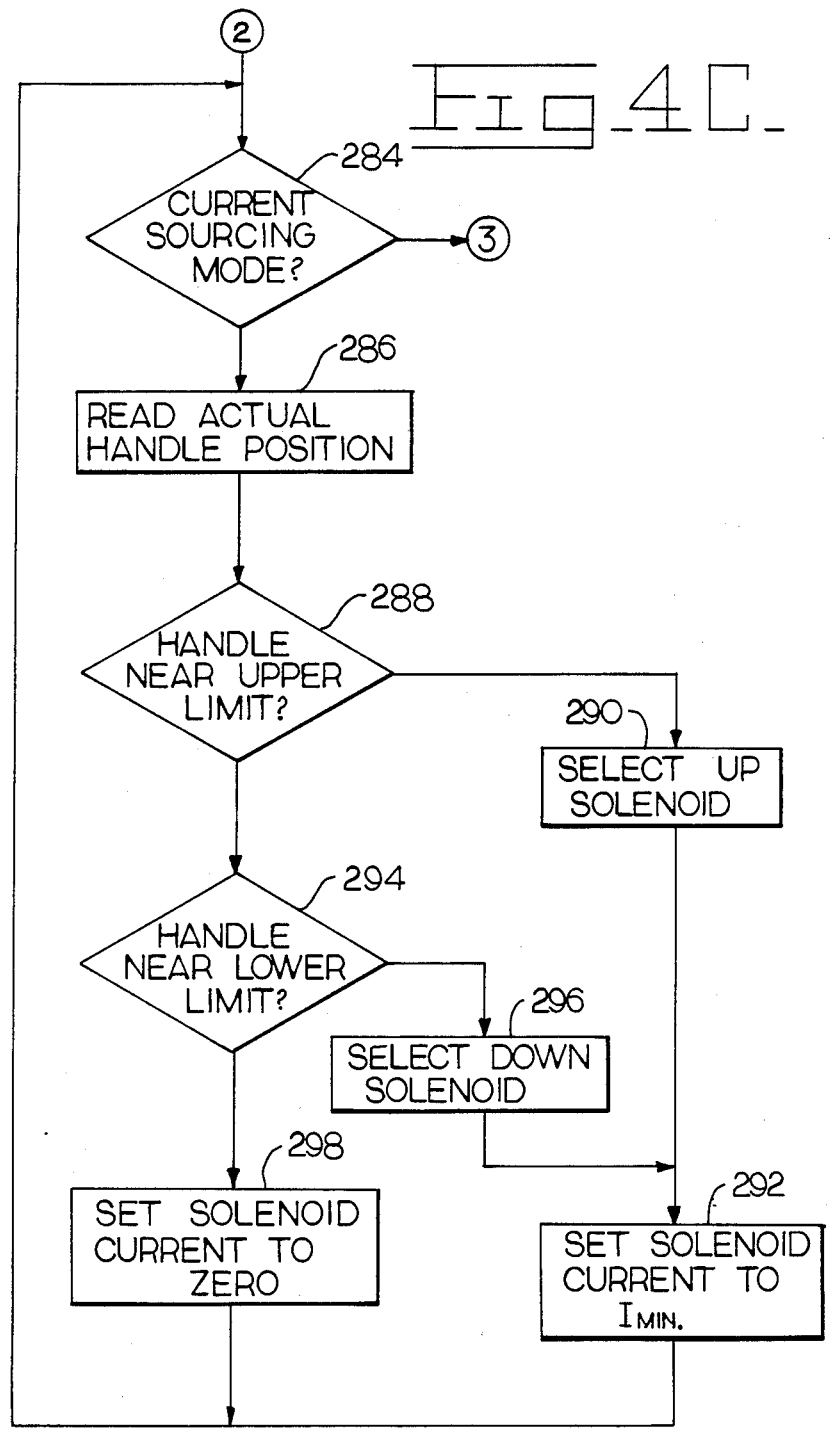
FIG. 4c illustrates a flowchart of an embodiment of the present invention.

Referring now to FIGS. 4a, 4b, and 4c, a flowchart illustrates one embodiment of the software needed to operate the microprocessor 98. The software begins at block 234 by reading the actual handle position and storing the instantaneous position in the variable $P_{handle}$. The microprocessor outputs the address of the handle position input and a start pulse on the data link 102 and then monitors the end of conversion signal on line 106. Upon receiving the signal via 106, the 8-bit word present on link 100 is read and stored as $P_{handle}$. Control is transferred to block 235 where a desired hitch position is computed from the handle position and stored in he variable $P_{des}$. At block 236 the actual hitch position is read via an operation substantially similar to that of reading the actual handle position with the exception of the address presented on link 104 being that of the hitch position input. The actual hitch position is stored in variable $P_{act}$.

The hitch position error is computed in block 238 by a means 239 in the microprocessor 98 which receives the actual and desired hitch position and delivers a signal correlative to the difference between the actual and desired hitch positions. The hitch position error is stored in the variable $P_{err}$ by using the formula:

$$P_{err} = P_{act} - P_{des}$$

In decision block 240, a means 241 in the microprocessor 98 receives the positional error signal and delivers a desired velocity signal which has a magnitude correlative to the magnitude of the positional error signal. The variable $P_{err}$ is multiplied by a constant k to convert the positional error into a desired velocity of the hitch 17. This simple equation ensures that as the positional error $P_{err}$ becomes greater, so too does the desired velocity $V_{des}$. Unchecked, this proportional relationship could lead to a desired hitch velocity $V_{des}$ which is above recommended operating speeds. To prevent this from occurring, the relationship $k(P_{err}) > V_{max}$ is tested and if found to be true, then the desired velocity $V_{des}$ of the hitch 17 is set to a maximum allowable velocity $V_{max}$ in block 242. Conversely, if the tested relationship is false, then the desired velocity $V_{des}$ maintains its proportionality to the positional error and is set equal to $k(P_{err})$ in block 244.

Control is transferred to block 246 where the actual hitch velocity is read by the microprocessor 98 via an operation similar to those performed in blocks 234,236 and stored as the variable $V_{act}$. A means 247 in the microprocessor 98 receives the actual and desired velocity signals and delivers a control signal which has a magnitude correlative to the difference between the actual and desired velocity signals. The magnitude of the corrective signal is determined in block 248 using the equation:

$$V_{err} = V_{des} - V_{act}$$

A means 249 in the microprocessor 98 receives the control signal and respectively controls the direction and velocity of movement of the hitch 17 in a direction to reduce the absolute magnitude of the positional error signal and the control signal. Block 250 forms the integral of the velocity error $V_{err}$ and transfers control to block 252. The sign of the positional error $P_{err}$ is used to determine the direction of desired movement and correspondingly, which of the solenoids 64,74 is selected. If the positional error $P_{err}$ is greater than zero, the down solenoid is selected in block 254 by delivering a "low" signal from the microprocessor 98 on line 146 to enable NOR gate 150 to pass the variable duty cycle signal from the amplifier 118 to the transistor 158. Alternately, if the positional error $P_{err}$ is less than zero, the up solenoid is selected in block 256 by delivering a "high" signal from the microprocessor 98 on line 146 to enable NOR gate 152 to pass the variable duty cycle signal from the amplifier 118 to the transistor 170.

An opportunity to save energy and extend the life of the solenoids and the hydraulic system arises when the hitch 17 has reached the upper travel limit. Typically, a certain degree of misalignment of the handle sensor is possible such that the hitch 17 cannot reach the desired position indicated by the handle 34. During normal operation, if the handle 34 is in the fully up position and the hitch 17 stops moving, then a software timer is initiated. If these conditions persist for a preselected duration of time, then block 258 transfers control to block 260 where the solenoid current is set to zero. The microprocessor 98 assumes that the hitch 17 has reached the maximum attainable height and shuts off power to the up solenoid. Subsequent movement of the handle 34 returns the software control to the normal mode of operation.

A similar mode of operation occurs when the handle 34 is not moved for an extended period of time and yet the hitch 17 remains at a position higher than the desired position. The microprocessor 98 assumes that the hitch is unable to reach the commanded position due to either contact with the ground or a travel limiting stop. Should these conditions be satisfied, then control transfers to block 264 where the solenoid current is set to a minimal value to allow the hitch to float. Rather than fix the hitch position, it is desirable to allow the hitch to move up and down in contact with the ground surface.

Movement of the hitch 17 is discontinued in response to the magnitude of the positional error signal $P_{err}$ being within a first preselected range. In block 266, the software checks to determine if the hitch position is within an inner deadband. If the hitch has moved to within a preprogrammed distance of the desired position, then control transfers to the block 260 where the solenoid current is set to zero and movement of the hitch 17 ceases. The three way valve 302 returns to the center position and the pressure in the feedback line 304 falls off significantly, causing the variable position swashplate to move to a low pressure standby position. The load on the engine is subsequently reduced resulting in a higher fuel efficiency. If the positional error is outside the inner deadband, the solenoid current is unaffected for the moment and control transfers to a block 268 where the status of the hook up mode input is read.

For the operator to initiate the hook up mode, he must position the switch to the hook up mode and accomplish a preselected sequencing of the position handle 34. In the block 270, the handle position is closely monitored to determine if the operator truly desires to be in the hook up mode and actuation of the switch was not accidental. To enter the hook up mode, the operator must position the handle 34 at the fully up, fully down, and middle position within a preselected duration of time. If the handle sequencing operation is not accomplished within the allotted time period, control transfers to the block 260 and the solenoid current is set to zero. Assuming that the sequencing operation is completed, a flag is set so that the operator need not reproduce the sequence while the switch remains actuated. The software reads the handle position in block 272 and respectively selects the up or down solenoid in blocks 274,276 if the handle 34 is in the fully up position or fully down position. Subsequently, in block 278, the solenoid current is set to an intermediate constant value and causes a preselected rate of movement in the selected direction until the handle 34 is moved from the fully actuated position. A handle position other than fully up or fully down causes control to be transferred to the block 260 where solenoid current is set to zero. Operation in the hook up mode allows the operator to accurately and absolutely position the hitch 17 by placing the handle 34 at the fully actuated position until the hitch 17 reaches the desired position. When the hitch 17 reaches the desired position, the operator simply moves the handle 34 from the fully actuated position and causes the solenoid current to be set to zero.

Control transfers to block 280 if the hook up mode switch is not actuated. Movement of the hitch 17 is initiated in response to the magnitude of the position error $P_{err}$ signal being outside a second preselected range. Within block 280, the status of a flag is checked to determine if the hitch position has been Inside the Inner deadband and Not Subsequently Outside an Outer deadband (IINSOO). If the flag is set, then control transfers to the block 260 and solenoid current is set to zero; however, if the flag is not set, then control transfers to block 282 where the solenoid current is set to the integral of the velocity error plus an offset $I_{min}$. The IINSOO flag is necessary to allow the outer deadband to provide a hysteresis type effect during positioning of the hitch 17. Without the flag, the solenoid current would be set to zero when the positional error $P_{err}$ fell below the outer deadband. The hitch 17 would never reach the inner deadband. The outer deadband should only become operational subsequent to the hitch 17 reaching the inner deadband. Hence, the IINSOO flag is set when the positional error $P_{err}$ falls inside the inner deadband and is reset when the positional error $P_{err}$ rises above the outer deadband.

The solenoid offset current $I_{min}$ is the current necessary to induce movement of the hitch 17 at a minimum rate. Obviously, this current level is highly dependent upon a number of factors, including the individual solenoids and hydraulic components. It is therefor necessary to calibrate the offset current for each individual hitch control. A calibration mode can be entered in the software by executing a preselected sequence of handle 34 movements. In block 284, the position of the hook-up mode switch is monitored so that movement of the switch between the "on" and "off" positions a total of three iterations causes software control to be transferred into a current sourcing mode. Actual handle position is read via the A/D 56 in block 286. Decision block 288 compares the handle position to the upper limit of movement. When the handle is moved to the fully up position, the up solenoid is selected in block 290 and the solenoid current is set to the offset $I_{min}$. Absent any movement of the handle 34 from the fully up position, the solenoid current will remain at the offset $I_{min}$ and the solenoid controlled valve can be manually adjusted until the hitch 17 begins to move upward. Similarly, the handle position is compared to the lower limit in block 294. The handle 34 being at the fully lowered position transfers control to block 296 where the down solenoid is selected. Once again, the block 292 sets the solenoid current to the offset $I_{min}$, and the solenoid controlled down valve can be manually adjusted until the hitch 17 begins to move downward. Software control can be returned to the main control routine by a power-down and power-up with the vehicle key switch.

Industrial Applicability

In the overall operation of the agricultural vehicle, assume that the operator is attempting to adjust the position of the hitch 17 and an implement such as a plow under normal operating conditions. The operator adjusts the handle 34 to the desired height or depth of the plow and the controller 26 controllably modulates one of the valves 22,24. Movement of the hitch 17 and plow is initiated toward the desired position at a rate dependent upon the magnitude of the positional error. The instantaneous velocity of the hitch 17 is constantly monitored and compared to the desired hitch velocity to arrive at a velocity error. Modulation of the valves 22,24 is continually adjusted to reduce the velocity error and thereby provide quick but controllable movement of the hitch 17 and plow in both the raise and lower conditions.

Should the handle 34 be moved to a position which is lower than the hitch 17 can reach, for example, through contact with the ground surface, then the solenoid current is set to a value which allows the hitch to "float". Rather than overheat the solenoid by continuing to deliver maximum current, the controller 26 reduces current to a "float" value and allows the hitch 17 and plow to move up and down with undulations in the ground surface. Alternately, the handle 34 can also request a position which is higher than the hitch 17 can reach. In this instance, it is not necessary that the hitch 17 be allowed to "float", but it is sufficient to simply maintain the hitch 17 at the maximum height it can reach. Accordingly, current to the solenoid is reduced to zero and the hitch 17 remains at the fully raised position.

When connecting an implement to the hitch 17, the normal control mode can produce unexpected and undesirable movement of the hitch 17. For example, the handle 34 is requesting a position which the hitch 17 has reached, but due to a slight leakage of hydraulic fluid, the hitch 17 slowly descends until it reaches the outer deadband limit. At this point the controller 26 will energize the up solenoid and move the hitch 17 toward the desired position. This unexpected movement can cause misalignment of the hitch 17 and plow and resultant difficulties in their connection. To eliminate these unpredictable movements during hook up, the operator enters an alternate mode of operation by actuating a switch and operating the handle through a preselected sequence of movements. In the hook up mode, the operator causes the hitch 17 to move up or down at a preselected rate by moving the handle 34 to the respective up and down limits of travel. The operator can now jog the hitch 17 into the desired position by selective movement of the handle 34 between an extreme position and a midrange position.

Other aspects, objects, and advantages of this invention can be obtained from a study of the drawings, the disclosure, and the appended claims.

We claim:

1. An apparatus for selectively positioning a movable work element of a work vehicle at a plurality of preselected locations, comprising:

a control element positionable at a plurality of preselected locations;

a spool valve having a neutral position and a number of operable positions;

first sensing means for delivering a first signal correlative to the location of said control element;

second sensing means for delivering a second signal correlative to the location of said work element;

comparator means for receiving said first and second signals and delivering a third signal correlative to the difference between said first and second signals;

means for receiving said third signal and delivering a desired velocity signal correlative to the magnitude of said third signal in response to said third signal being less than a preselected maximum valve and having a magnitude set to the preselected maximum value in response to said third signal being greater than the preselected maximum valve;

means for receiving and differentiating said second signal, and delivering an actual velocity signal correlative to the velocity of said movable work element;

means for receiving said actual and desired velocity signals and delivering a control signal correlative to the absolute difference between said actual and desired velocity signals and representative of a desired displacement of said spool valve from said neutral position; and means for receiving said control signal and for delivering a pilot pressure to position said spool valve in response to the magnitude of said pilot pressure for controller the direction and velocity of movement of said work element so as to be in a direction to reduce the absolute magnitude of said third signal and said control signal.

2. An apparatus for selectively positioning a movable work element of a work vehicle at a plurality of preselected locations, comprising:

a control element positionable at a plurality of preselected locations;

a spool valve having a neutral position and a number of operable positions;

first sensing means for delivering a first signal correlative to the location of said control element;

second sensing means for delivering a second signal correlative to the location of said work element;

comparator means for receiving said first and second signals and delivering a third signal correlative to the difference between said first and second signals;

means for receiving said third signal and delivering a desired velocity signal wherein the magnitude of said desired velocity signal is directly proportional to the magnitude of said third signal when said third signal is less than a preselected maximum valve;

means for delivering an actual velocity signal correlative to the velocity of said movable work element;

means for receiving said actual and desired velocity signals and for delivering a control signal correlative to the absolute difference between said actual and desired velocity signals and being further correlative to a desired displacement of said spool valve from said neutral position; and hydraulic means for receiving said control signal and for delivering a pilot pressure to position said spool valve in response to the magnitude of said pilot pressure for controlling the direction and velocity of movement of said work element so as to he in a direction to reduce the absolute magnitude of said third signal and said control signal.

3. The apparatus, as set forth in claim 2, wherein said third signal is adapted to cause the movement of said work element to be initiated in response to the magnitude of said third signal being within a first preselected range.

4. The apparatus, as set forth in claim 3, wherein said third signal is adapted to cause the movement of said work element to be initiated in response to the magnitude of said third signal being outside a second preselected range.

5. The apparatus, as set forth in claim 4, wherein said second preselected range is greater than said first preselected range.

6. The apparatus, as set forth in claim 2, wherein said means for delivering said control signal sets said control signal to a preselected minimum valve in response to said third signal remaining greater than zero and substantially constant for a preselected duration of time.

7. The apparatus, as set forth in claim 2, wherein said control element is manually positionable between first and second limits of travel and includes a second mode of operation wherein said third signal is set to a preselected minimum value in response to said control element being manually positioned adjacent said first limit of travel 8. The apparatus, as set forth in claim 2, wherein said means for controlling the direction and velocity of movement of said work element includes a hydraulic cylinder and first and second solenoid operated valves, said valves being in hydraulic communication with said hydraulic cylinder and alternately actuatable to reverse the flow of hydraulic fluid through said hydraulic cylinder whereby the cylinder may be selectively operated in first and second opposite directions in response to respective actuation of said first and second solenoid operated valves.

9. The apparatus, as set forth in claim 8, wherein the actuation of said first and second valves is correlative to said control signal having a fixed frequency and variable duty cycle, the magnitude of said duty cycle being correlative to the absolute difference between said actual and desired velocity signals.

10. The apparatus, as set forth in claim 8, wherein one of said first and second valves is separately actuatable in response to the sign of said third signal being positive and the other of said valves is separately actuatable in response to the sign of said third signal being negative.

11. The apparatus set for in claim 2, wherein said means for delivering said control signal sets said control signal to zero in response to said third signal remaining less than zero and said actual velocity signal remaining zero for a set period of time.

12. The apparatus set forth in claim 2, including said control element being moveable to a first limit of travel, a second limit of travel and an intermediate position within a preselected minimum time to initiate a hookup mode.

13. The apparatus set forth in claim 12, wherein after activating said hookup mode, said control signal is set to a predetermined valve in response to said control element being positioned at one of said first and second limits of travel.

14. The apparatus set forth in claim 12, wherein after activating said hookup mode, said control signal is set to a zero in response to said control element being positioned at a location other than said first and second limits of travel.

* * * * *

UNITED STATES PATENT AND TRADEMARK OFFICE
CERTIFICATE OF CORRECTION

PATENT NO. : 4,852,657

DATED : August 1, 1989

INVENTOR(S) : Gerald D. Hardy et al.

It is certified that error appears in the above-identified patent and that said Letters Patent is hereby corrected as shown below:

Claim 1, column 12, line 31: delete "valve" and insert --value--

Claim 1, column 12, line 34: delete "valve" and insert --value--

Claim 2, column 13, line 3: delete "valve" and insert --value--

Claim 2, column 13, line 16: delete "he" and insert --be--

Claim 6, column 13, line 34: delete "valve" and insert --value--

Signed and Sealed this

Fifth Day of June, 1990

Attest:

HARRY F. MANBECK, JR.

*Attesting Officer*     *Commissioner of Patents and Trademarks*